United States Patent [19]
Wells et al.

[11] Patent Number: 5,815,992
[45] Date of Patent: Oct. 6, 1998

[54] ADJUSTABLE HEIGHT STEPPED SHIM

[75] Inventors: Raymond Wells, Luraville; Stephen J. Spencer, Belleair, both of Fla.

[73] Assignee: Stephen Spencer, Largo, Fla.; a part interest

[21] Appl. No.: 832,808

[22] Filed: Apr. 4, 1997

[51] Int. Cl.⁶ .................................................. E04B 2/82
[52] U.S. Cl. ...................... 52/126.1; 248/188.2; 248/649
[58] Field of Search ................ 52/126.1, 126.3, 52/126.5, 126.6; 254/104; 248/188.2, 649

[56] References Cited

U.S. PATENT DOCUMENTS

| | | |
|---|---|---|
| 4,135,335 | 1/1979 | Jensen . |
| 4,281,739 | 8/1981 | Keiser ............................. 248/188.2 X |
| 4,485,607 | 12/1984 | Nelson . |
| 4,586,727 | 5/1986 | Andrieu et al. .................. 248/188.2 X |
| 4,731,965 | 3/1988 | Jensen . |
| 4,776,548 | 10/1988 | Bezenek ............................. 248/188.2 |
| 5,054,250 | 10/1991 | Foss . |

*Primary Examiner*—Creighton Smith
*Attorney, Agent, or Firm*—Larson & Larson P.A.; James E. Larson

[57] ABSTRACT

A two part, weight bearing shim adjustable in height. The shim comprises two generally triangular or wedge shaped members. A base member has a flat bottom surface and a stepped upper surface. A smaller member is placed in inverted relationship on the base member. The smaller member has a stepped lower surface cooperating with the stepped upper surface of the base member. The upper surface of the smaller member is parallel to the bottom surface of the base member after assembly. The base and smaller members are mutually keyed to prevent improper interfit during assembly. The base member has vertical voids or bores formed in its body. This construction promotes ability of the bottom surface to engage a rough or irregular environmental surface, and minimizes the amount of constituent material required for fabrication. Recycled plastic is a preferred constituent material.

10 Claims, 3 Drawing Sheets

ADJUSTABLE HEIGHT STEPPED SHIM

BACKGROUND OF THE INVENTION

1. Field of the Invention

The present invention relates to shims for adjustably spacing apart two objects. More particularly, the invention relates to weight bearing shims for supporting a first object upon a second object or upon an environmental surface. The novel shim comprises two complementary components, a base component being stepped to provide plural positions for engaging the second component. The second component has a flat surface for engaging one of the two spaced apart object, and structure for engaging the complementary base component of the shim.

2. Description of the Prior Art

As frequently occurs in the field of construction, a large and heavy object, such as a module of a building, must be supported on another component of the building, such as a foundation or a lower module of the building. It is conventional to employ shims in such situation. A shim, by its nature, can accommodate irregular or unpredictably dimensioned gaps which must be spanned to cause contact between the two building components. It must be able to span gaps in small increments of distance, to provide precise adjustment of the gap, and must be able to bear significant weight. The weight bearing function significantly influences design of the shim.

U.S. Pat. No. 4,135,335, issued to Karsten Jensen on Jan. 23, 1979, illustrates a shim comprising complementary, essentially mirror image triangular wedges which are assembled inverted relative to one another. Each wedge has a surface bearing indentations or texturing which mates with a corresponding surface formed in the complementary wedge. However, unlike the present invention, it is possible for the two wedges to be placed together such that the plane of the flat bottom surface of one wedge is broken by the other. This causes the assembled pair to be unstable if placed on a flat supporting surface in this condition. By contrast, the present invention has a relatively large component and a relatively small component. The small component seats selectively upon steps formed in the large component. These steps formed in the large component and their corresponding contact surfaces of the small component are parallel to one another, to the base of the large component, and to the top surface of the small component. This construction, as well as interlocking keys and partially hollow construction of the large component, both found in the present invention, is not seen in the device of Jensen '335.

Adjustable shims are also seen in U.S. Pat. No. 4,485,607, issued to Terry L. Nelson on Dec. 4, 1984, 4,731,965, issued to Brian A. Jensen on Mar. 22, 1988, and 5,054,250, issued to Robert E. Foss on Oct. 8, 1991. The shims of Jensen '965 and Foss are biased to expand, so as to actively fill void space. These devices are not load bearing, and lack the complementary stepped members of the present invention.

The shims of Nelson include a variable number of leaves stacked about bolts. The shimmed space is dependent upon the number of leaves in the stack. By contrast, the present invention can be adjusted to a plurality of thicknesses utilizing only two members.

None of the above inventions and patents, taken either singly or in combination, is seen to describe the instant invention as claimed.

SUMMARY OF THE INVENTION

The present invention provides a weight bearing pair of complementary members assembled together to provide a shim for bearing large weights. A preferred application is support of a building module, such as an inhabitable trailer on a masonry foundation. Of the two members, a larger member has a flat base and a stepped upper surface. The smaller member is selectively positioned on the stepped upper surface, engaging two adjacent steps. The smaller member is stepped in cooperating fashion so that when installed, it will expose a flat upper surface parallel to the flat base of the larger member. The load is placed on the upper surface of the smaller member.

The nature of the steps is that all abutting surfaces are vertical and horizontal. This construction avoids any lateral force which would tend to result from stacking two triangular wedges with one inclined surface resting directly on a corresponding inclined surface. Also, the various portions of the two members are configured and dimension so that the entire lower surface of the small member contacts and is supported by the upper surface of the base member. Thus, the small member is not called upon to perform a bridging or spanning function.

The two members fit together in tongue and groove manner. The tongue and grooves are keyed to prevent backward assembly. Construction of the two members assures that a substantial portion of the area of the assembly includes solid material for bearing great weights. This is achieved by causing all voids in the solid material to extend only vertically. Thus, there are no portions of either member which must bridge an unsupported void while bearing weight.

Voids, where present, exist among intersecting vertical walls formed in the base member. The smaller member is so designed that these vertical walls will be located under the perimeter of the smaller member in any selected position of the smaller member relative to the base member. This assures maximal stability of the smaller member regardless of adjustment of height of the shim.

The shim is preferably fabricated from synthetic resin, or recycled plastic material. Plastic material is lightweight, and impervious to deterioration from natural causes, such as infestation by vermin, chemical attack, saturation by water, and the like, while possessing sufficient strength as to perform its function. By contrast, wooden shims or wedges conventionally employed for this purpose can deform responsive to continuous pressure. Plastic resists shrinking and swelling, particularly if immersed in water. Plastic will not rust or freeze, thereby making subsequent adjustments impossible.

Plastic has the further properties of being susceptible to fabrication by economical methods so as to avoid potentially injurious sharp edges, unlike steel. Also, plastic resists forming sharp chips when being driven by impact, which may eventually be required to move the shim while bearing weight, or to separate the two members after a prolonged period of assembly and use. Plastic is lighter than steel, so that bulk shipments are easier to transport and maneuver.

The shim is readily molded from recycled plastics, and requires no fasteners or other components for successful deployment. Construction from recycled plastic material also provides ecologically sound disposal of plastic material.

Accordingly, it is a principal object of the invention to provide a weight bearing shim having adjustable height.

It is another object of the invention to avoid lateral displacement of any component of the shim responsive to loads.

It is a further object of the invention to provide a shim in two cooperating members, each member contacting the other only at vertical and horizontal abutting surfaces.

Still another object of the invention is to assure that no part of the smaller member be subjected to spanning or bridging function.

An additional object of the invention is to assure correct assembly by keying the components to interfit only in intended positions relative to one another.

It is again an object of the invention that the adjustable upper member, after assembly, always have perimetric support provided by the base member.

Yet an additional object of the invention is to promote usage of recycled plastic materials.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
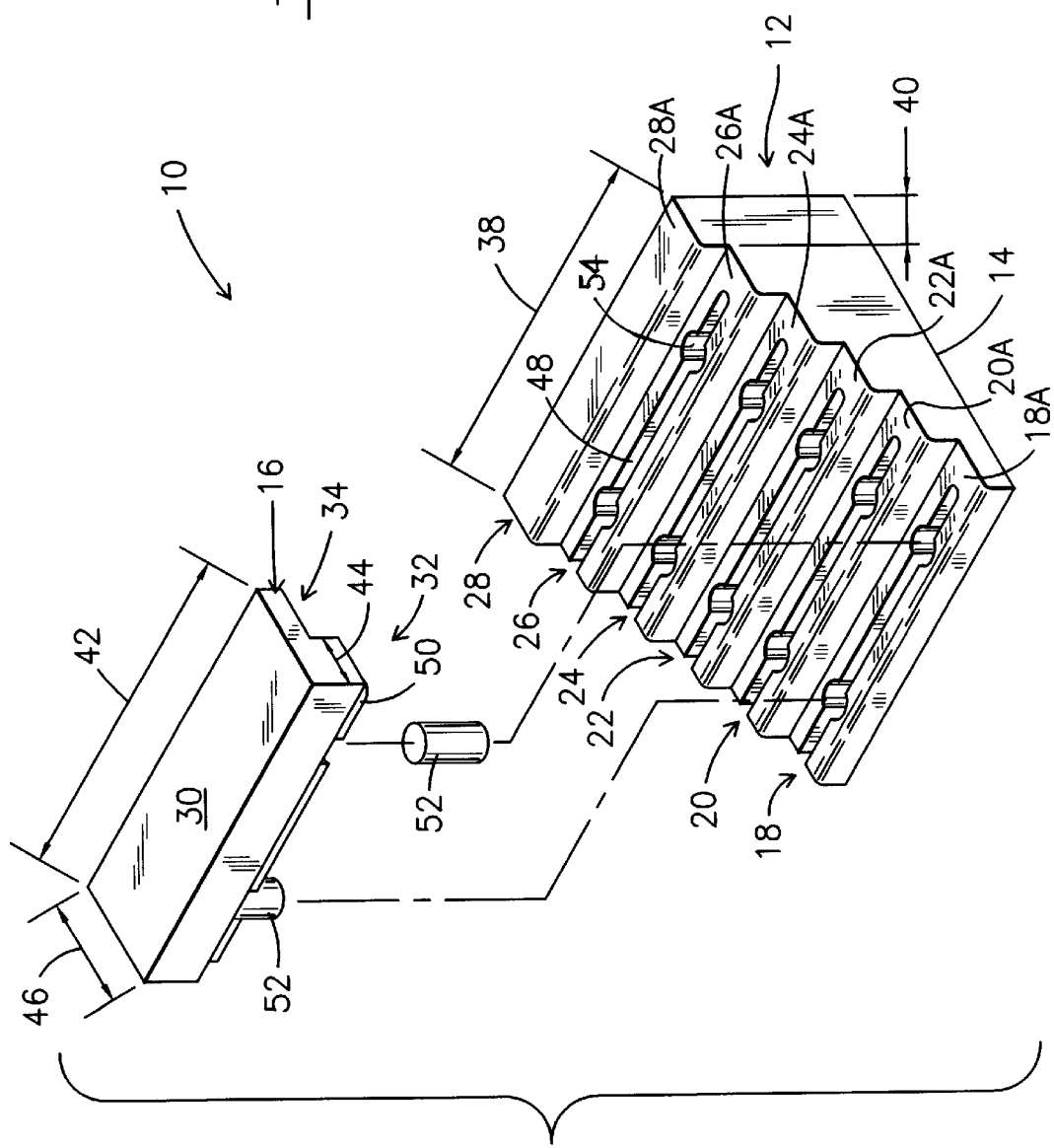
FIG. 1 is an exploded side perspective view of the invention.

Turning now to FIG. 1 of the drawings, weight bearing shim 10 is seen to comprise a base member 12 having a flat base surface 14 and a smaller member 16. Base member 12 has a stepped upper surface including steps 18, 20, 22, 24, 26, 28. Base surface 14 is parallel to the stepped upper surface of base member 12. Member 16 has an upper surface 30 and two steps 32, 34 formed in its lower surface. Upper surface 30 and the lower surface of member 16 are parallel to one another.

Figure 2:
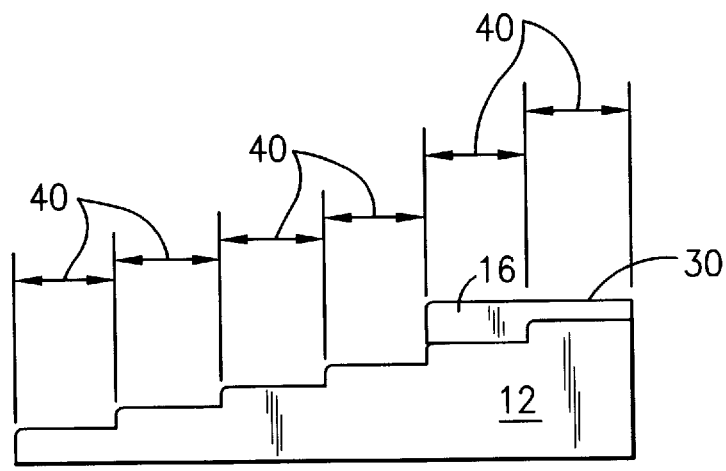
FIGS. 2 and 3 are side elevational views of the invention, illustrating different positions in which the upper member of the invention may be assembled on the lower member.
Figure 3:
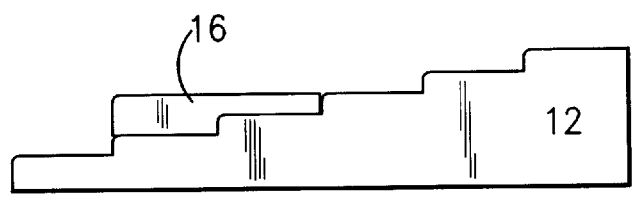
Figure 5:
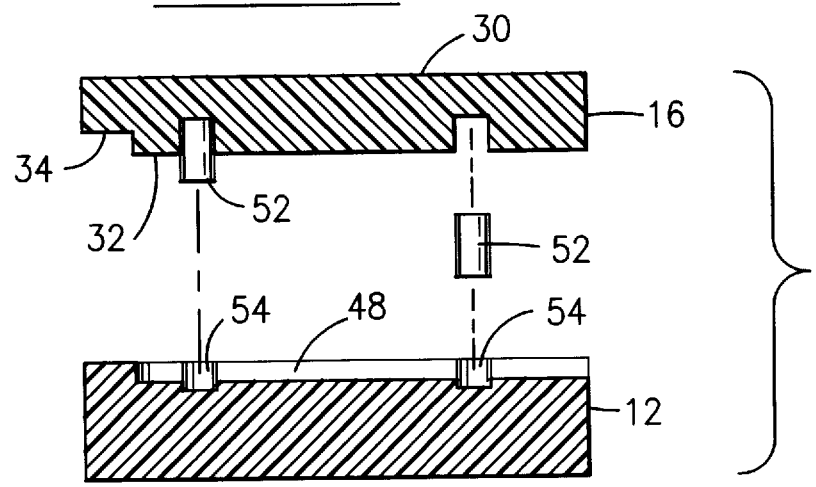
FIG. 5 is a cross section of a base member and smaller member about to be engaged.

Shim 10 enables adjustment of its height by selectively repositioning member 16 with respect to member 12. Member 16 seats on base member 12 in a selected operative relationship or position. The actual operative position is in overlying, abutting relationship with respect to base member 12. FIGS. 2 and 3 illustrate two possible operative positions of member 16. In the embodiment depicted, any of four possible operative positions may be selected, thereby enabling adjustment of height of the assembled shim 10.

Again referring to FIG. 1, each step 18, 20, 22, 24, 26, or 28 has a contact surface 18A, 20A, 22A, 24A, 26A, or 28A (respectively) which is parallel to base surface 14. Each step 18, 20, 22, 24, 26, or 28 has a predetermined width 38 and depth 40. Steps 32 and 34 of member 16 have equal width 42 and depth 44. The overall depth 46 of member 16 is equal to the combined depths of two steps of base member 12. Therefore, each one of steps 32 and 34 corresponds in area to that of each one of steps 18, 20, 22, 24, 26, and 28 of base member 12. As will be seen, adjustment of height of shim 10 may be made in increments of magnitude less than that of depth 46 of upper top surface 30 of smaller member 16.

It will therefore be seen from FIGS. 2 and 3 that when assembled, base surface 14 is parallel to upper surface 30 of member 16. Upper surface 30 is the surface upon which the load (not shown) is placed. Parallel relationship of base surface 16 to upper surface 30 thus assures that when the supporting environmental surface (not shown) is level, the load will also be level. Also, this parallel relationship assures that no lateral force develops, as would ensue if the meeting faces of members 12 and 16 were inclined and not stepped. Therefore, the stepped configuration imparts stability to shim 10 when assembled.

It will also be appreciated that member 16 is modular with respect to base member 14. Widths 42, 38 of member 16 and base member 12 (respectively) are equal. Depth 46 of member 16 is equal to twice the width 40 of any step 18, 20, 22, 24, 26, or 28, thus assuring continuous contact between the upper surfaces of two adjacent contact surfaces 18A, 20A, 22A, 24A, 26A, or 28A of any adjacent two of steps 18, 20, 22, 24, 26, or 28 and corresponding lower surfaces of steps 32 and 34 of member 16. Therefore, modular relationship will be understood to signify that the lower surface of member 16 is dimensioned and configured to overlie base member 12 without unsupported overhang at any selected operative position. Stated another way, all of the lower surface of smaller member 16 makes contact with the upper surface of base member 12 when placed in an operative position.

To assure that member 16 is installed on base member 12 correctly, rather than unstably, as could occur if member 16 were installed backwardly from the positions shown in the drawings, the two members 12, 16 are keyed. Keying assures that all of the lower surface of smaller member 16 make contact with the upper surface of base member 12 when smaller member 16 is placed in an operative relationship. Partial support of smaller member 16, which might occur from backward installation, is thus prevented.

In the embodiment depicted, keying is provided by grooves 48 formed in steps 18, 20, 22, 24, and 26 and a cooperating short wall or tongue 50 formed in step 32 of member 16. Each groove 48 is disposed asymmetrically within base member 12, so that member 16 may be pressed fully into contact with base member 12 only when in correct orientation. Tongue 50 is reinforced by thick projections or pegs 52, which fit cooperatively into corresponding sockets 54 formed in base member 12.

Figure 4:
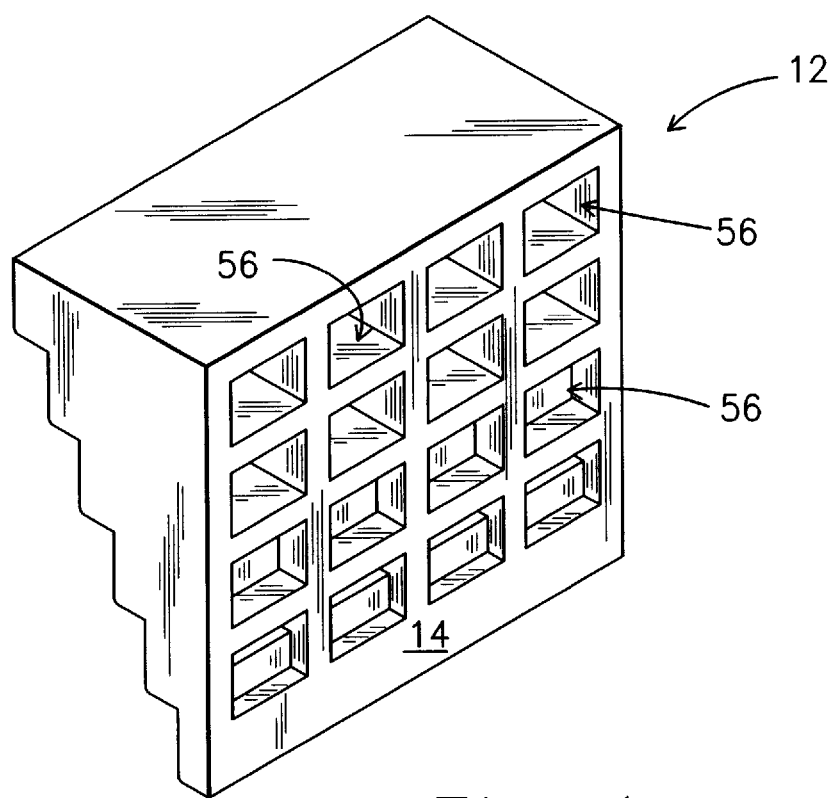
FIG. 4 is a bottom perspective view of the invention.

Turning now to FIG. 4, flatness of base surface 14 signifies that a substantial portion of base surface 14 occupies one plane. However, base surface 14 is not continuous in that it includes all possible points on the quadrilateral figure defined by its perimeter when considered in plan view. A plurality of bores 56 opening at surface 14 are formed in base member 12. The downwardly exposed surface of base member 12 will therefore include both points located on a plane located at the bottom of base member 12, and also the ceilings (not shown) of bores 56. Base surface 14 will be understood to include only points located on the plane located at the bottom of base member 12, and due to presence of bores 56, will be termed "discontinuous". The discontinuous nature of base surface 14 enables superior engagement of a slightly rough or non planar surface, which is typical of a concrete foundation wall (not shown). Bores 56 both enable discontinuity of base surface 14 and also minimizes the amount of constituent material of base member 12, while substantially maintaining ability to bear weight in a vertical direction. Recycled synthetic resin or plastic is a preferred constituent material.

Obviously, the present invention is subject to many variations and modifications which may be introduced without departing from the spirit of the invention. For example, width 42 of member 16 may be less than the width 38 of base member 12. Tongue 50, pegs 52, and grooves 48 may be reversed from the arrangements illustrated to similar effect. Keying may be provided only by pegs 52, if pegs 52 are located in suitably asymmetrical locations. Bores 56 may be configured other than square, and may be spaced at different or even odd or random intervals, if desired.

It is to be understood that the present invention is not limited to the embodiments described above, but encompasses any and all embodiments within the scope of the following claims.

I claim:

1. A weight bearing shim for supporting a building module and enabling adjustment of height, said shim comprising:
    a base member having a flat base surface and a stepped first upper surface, said first upper surface including a plurality of steps formed therein, each said step having a contact surface parallel to said flat base surface of said base member and a step riser between each contact surface perpendicular to said flat surface of said base member;
    an adjustable smaller member having a second upper surface having width and depth, and a lower surface parallel to said second upper surface, said lower surface being dimensioned and configured in modular relation to said first upper surface of said base member such that all of said lower surface of said smaller member makes contact with said first upper surface of said base member; and
    a keying means in the first upper surface for assuring that all of said lower surface of said smaller member make contact with said first upper surface of said base member when said smaller member is placed in overlying, abutting operative relationship to said base member, whereby partial support of said smaller member is prevented when said smaller member is assembled to said base member.

2. The shim according to claim 1, said keying means comprising a peg formed in one of said base member and said smaller member, and a corresponding socket formed in the other of said base member and said smaller member.

3. The shim according to claim 1, said keying means comprising a groove disposed asymmetrically within one of said base member and said smaller member, and a corresponding tongue formed in the other of said base member and said smaller member.

4. The shim according to claim 1, said lower surface of said smaller member having at least two second steps formed therein, each one of said second steps corresponding in area to that of each one of said first steps of said base member, whereby adjustment of height of said shim is made in increments of magnitude less than that of said depth of said second upper surface of said smaller member.

5. The shim according to claim 1, said base member having a plurality of vertical bores formed therein and opening at said base surface, whereby said base surface is discontinuous, and whereby constituent material of said base member is minimized, while substantially maintaining ability to bear weight in a vertical direction.

6. The shim according to claim 1, said base member and said smaller member being fabricated from recycled plastic material.

7. A weight bearing shim for supporting a building module and enabling adjustment of height, said shim comprising:
    a base member having a flat base surface and a stepped first upper surface, said first upper surface including a plurality of steps formed therein, each said step having a contact surface parallel to said flat base surface of said base member and a step riser between each said contact surface perpendicular to said flat base surface of said base member;
    an adjustable smaller member having a second upper surface having width and depth, and a lower surface parallel to said second upper surface, said lower surface being dimensioned and configured in modular relation to said first upper surface of said base member such that all of said lower surface of said smaller member makes contact with said first upper surface of said base member when said smaller member is placed in overlying, abutting operative relationship to said base member, said lower surface of said smaller member having at least two second steps formed therein, each one of said second steps corresponding in area to that of each one of said first steps of said base member, whereby adjustment of height of said shim is made in increments of magnitude less than that of said depth of said second upper surface of said smaller member; and
    keying means for assuring that all of said lower surface of said smaller member make contact with said first upper surface of said base member when said smaller member is placed in overlying, abutting operative relationship to said base member, whereby partial support of said smaller member is prevented when said smaller member is assembled to said base member.

8. The shim according to claim 7, said keying means comprising a peg formed in one of said base member and said smaller member, and a corresponding socket formed in the other of said base member and said smaller member.

9. The shim according to claim 7, said keying means comprising a groove disposed asymmetrically within one of said base member and said smaller member, and a corresponding tongue formed in the other of said base member and said smaller member.

10. The shim according to claim 7, said base member and said smaller member being fabricated from recycled plastic material, and said base member having a plurality of vertical bores formed therein and opening at said base surface, whereby said base surface is discontinuous, and whereby constituent material of said base member is minimized, while substantially maintaining ability to bear weight in a vertical direction.

* * * * *